March 14, 1967 P. E. BRAUN ET AL 3,309,069
MECHANISM FOR A CONSTANT METERING FORCE CARBURETOR
Filed May 13, 1964 5 Sheets-Sheet 1

PAUL E. BRAUN
ERNEST J. OBERMEYER, JR.
INVENTORS

BY John R. Faulkner
Ernest A. Beutler
ATTORNEYS

March 14, 1967 P. E. BRAUN ET AL 3,309,069
MECHANISM FOR A CONSTANT METERING FORCE CARBURETOR
Filed May 13, 1964 5 Sheets-Sheet 3

PAUL E. BRAUN
ERNEST J. OBERMEYER, JR.
INVENTORS

BY John R. Faulkner
Ernest A. Leutler
ATTORNEYS

March 14, 1967 P. E. BRAUN ET AL 3,309,069
MECHANISM FOR A CONSTANT METERING FORCE CARBURETOR
Filed May 13, 1964 5 Sheets-Sheet 4

PAUL E. BRAUN
ERNEST J. OBERMEYER, JR.
INVENTORS

BY John R. Faulkner
Ernest A. Reuter
ATTORNEYS

PAUL E. BRAUN
ERNEST J. OBERMEYER, JR.
INVENTORS

United States Patent Office 3,309,069
Patented Mar. 14, 1967

3,309,069
MECHANISM FOR A CONSTANT METERING
FORCE CARBURETOR
Paul E. Braun, Birmingham, and Ernest J. Obermeyer, Jr., Detroit, Mich., assignors to Ford Motor Company, Dearborn, Mich., a corporation of Delaware
Filed May 13, 1964, Ser. No. 367,097
6 Claims. (Cl. 261—39)

This invention relates to a constant metering force carburetor for an internal combustion engine and more particularly to an improved cold weather starting enrichment mechanism for a carburetor.

This invention is related to the copending patent application entitled, "Constant Metering Force Carburetor," filed in the names of Paul E. Braun, Albert A. Pruchno and Richard J. Freismuth, Ser. No. 355,291, filed Mar. 27, 1964. In that patent application, a constant metering force carburetor having an adjustable interconnection between an air valve and a fuel metering valve is disclosed. The adjustable interconnection and the relationship between the fuel metering valve and the air valve is altered in response to engine temperature and other engine operating variables to provide fuel enrichment under certain engine operating characteristics. The temperature responsive adjustment provided a richer than normal mixture for starting and running at low ambient temperatures. It may be desirable, however, to provide a still further enrichment during cranking for easier starting at very low temperatures. At these low temperatures, the engine cranking vacuum may be insufficient to draw enough fuel into the combustion chamber through the cold intake manifold passages for firing.

It therefore is the principal object of this invention to provide an improved cold starting enrichment mechanism for a carburetor.

Although cold starting enrichment devices have been proposed for constant metering force carburetors to provide additional fuel flow at low temperature, these devices generally employ some form of a separate fuel discharge circuit. The additional expense of the extra fuel circuit makes these devices unacceptable.

It is a further object of this invention to provide a cold starting enrichment mechanism that functions through the main discharge circuit of the carburetor.

A carburetor for an internal combustion engine embodying this invention comprises an induction passage and a throttle valve for controlling the flow of combustible mixture through the induction passage. Air valve means are positioned in the induction passage anterior to the throttle valve for maintaining a substantially constant pressure between the air valve and the throttle valve. A fuel discharge circuit, controlled by a fuel metering valve, discharges fuel into the induction passage between the air and throttle valves. First temperature responsive means are provided for altering the relationship between the fuel metering valve and the air valve for providing enrichment at low temperatures. Second temperature responsive means are provided for altering the relationship between the fuel and air valves at low temperatures and when the associated engine is being cranked.

Further objects and advantages of this invention will become more apparent when considered in conjunction with the accompanying drawings, wherein.

Figure 1:
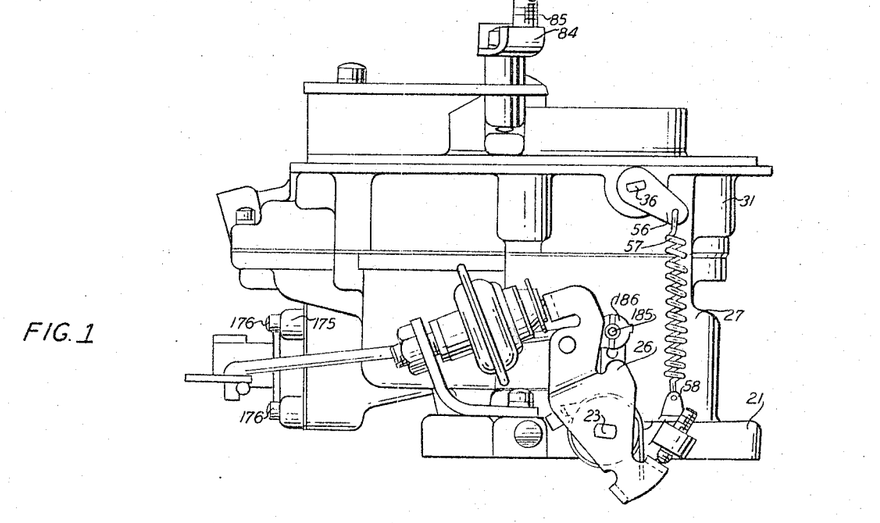
FIGURE 1 is a side-elevational view of a constant metering force carburetor embodying this invention.

Referring now in detail to the drawings, the carburetor comprises a throttle body 21 forming a pair of induction passage outlets 22 (only one of which is shown). A throttle valve shaft 23 extends transversely across the induction passage outlet 22 and is journaled at each end in the throttle body 21. A throttle valve 24 is affixed to the throttle valve shaft 23 as a pin 25 in each induction passage outlet 22. A manually operated throttle lever 26 is affixed to the throttle valve shaft 23 at one side of the carburetor (FIGURE 1). Suitable accelerator linkage (not shown) is connected to the throttle lever 26 to permit manual positioning of the throttle lever 26, throttle valve shaft 23 and throttle valves 24 to control the rate of mixture discharge from the induction passage outlets 22.

The throttle body 21 is affixed by a plurality of bolts (not shown) to a lower main carburetor body portion 27. The lower body portion 27 is formed with a pair of induction passages 28 that register with the induction passage outlets 22 of the throttle body 21. On one side of the induction passages 28, the lower body portion 27 is formed with a fuel bowl 29.

Figures 2, 6:
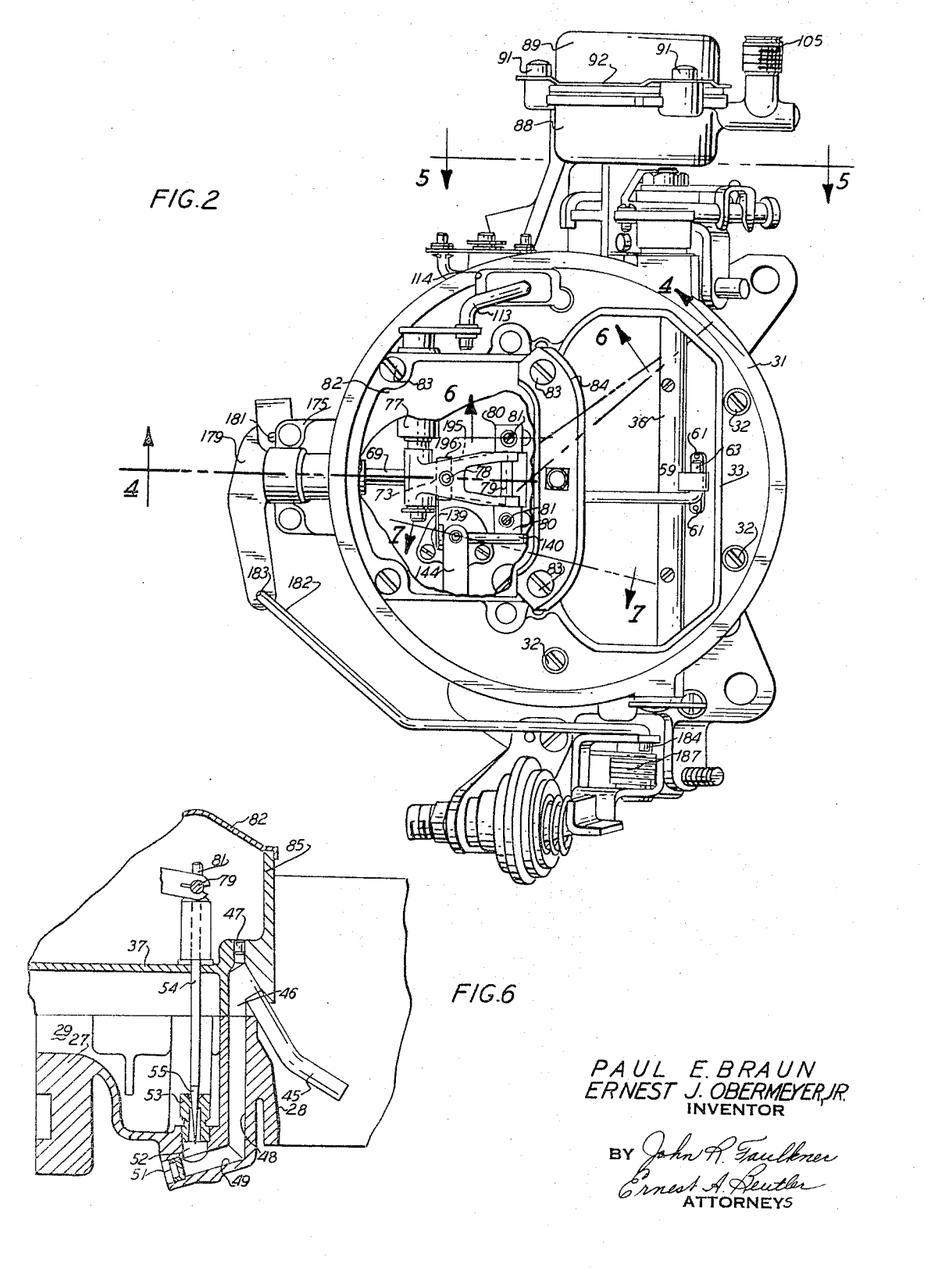
FIGURE 2 is a top plan view of the carburetor, with portions broken away.
FIGURE 6 is a cross-sectional view taken along the line 6—6 of FIGURE 2.

An upper main carburetor body portion 31 is affixed to the lower body portion 27 by a plurality of bolts 32 (FIGURE 2). The upper main body portion 31 is formed with an air horn section 33 that forms a common induction system air inlet 34 for the induction passages 28 of the lower body portion 27. An unbalanced air valve 35 is fixed eccentrically to an air valve shaft 36 in the air horn section 33 to control the admission of air to the induction passages 28. The air valve shaft 36 is journaled at opposite sides in the air horn section 33. It will be observed that the eccentricity of unbalance of the air valve 35 upon the air valve shaft 36 is such that a decreased pressure in the induction passages 28 will cause the air valve 35 to be rotated toward its fully opened position.

Figure 4:
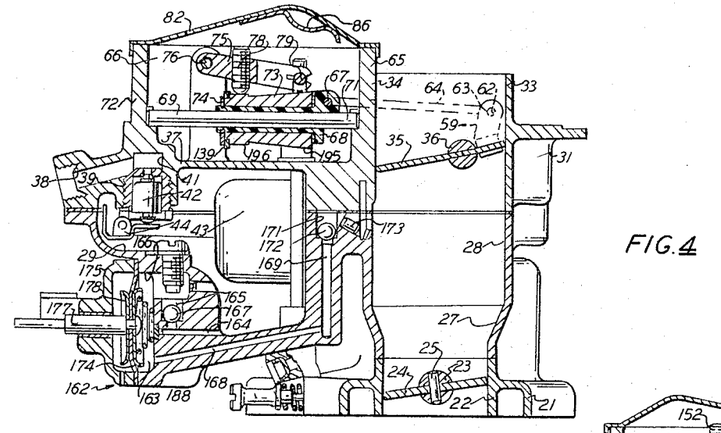
FIGURE 4 is a cross-sectional view taken along the line 4—4 of FIGURE 2.

A horizontal wall 37 of the upper body portion 31 extends across the fuel bowl 29 to form a cover therefore. A fuel inlet passage 38 is formed in the upper body portion 31 at one side of the fuel bowl 29 (FIGURE 4). A needle valve seat 39 is threaded into a vertically extending fuel passage 41 that intersects the fuel inlet passage 38. A needle valve 42 coacts with the needle valve seat 39 to control the admission of fuel into the fuel bowl 29. A float 43 is pivotally supported upon a float valve shaft 44 to control the position of the needle valve 42 and maintain the uniform fuel level in the fuel bowl 29.

Fuel is discharged from the fuel bowl 29 into each of the induction passages 28 by a discharge nozzle 45 (FIGURE 6) that is inserted into the upper body portion 31. The upper end of the discharge nozzle 45 opens into a vertically disposed fuel passage 46 formed in the upper body portion 31. An air bleed restriction 47 positioned in the horizontal wall 37 at the upper end of the fuel passage 46 permits a limited amount of air to pass into the discharge circuit. The fuel passage 46 in the upper body portion 31 registers with a similar, vertical fuel passage 48 formed in the lower body portion 27. The vertical passage 48 is intersected at its lower end by a diagonally extending fuel passage 49 formed in the lower surface of the lower body portion 27. The outer end of the passage 49 is closed by a plug 51. A vertical fuel passage 52 extends from the fuel bowl 29 to the fuel passage 49. A metering jet 53 is threaded into the inlet end of the vertical passage 52. A fuel metering rod 54 having a tapered lower end 55 coacts with the opening in the metering jet 53 to regulate the rate of fuel discharge from the fuel bowl 29 into the induction passage 28. It is to be understood that similar fuel discharge circuits are provided for each of the induction passages 28, only one of which has been described in detail.

As has been noted, the air valve 35 is unbalanced so that it tends to open in response to pressure decreases in the induction passages 28. A lever 56 is affixed to the air valve shaft 36 at one side of the carburetor (FIGURE 1). One end of a coil spring 57 is affixed to the end of the lever 56 and the other end of the spring 57 is fixed to a tab 58 formed on the throttle body 21. The coil spring 57 exerts a force upon the air valve 35 through the air valve shaft 36 that urges the air valve 35 toward its closed position. The pressure differential acting upon the air valve 35, however, tends to cause the air valve to move to a position that will maintain a predetermined pressure in the induction passages 28. Movement of the air valve 35 is transmitted to the fuel metering rods 54 to establish the substantially uniform fuel air ratio discharge at all times. The linkage now to be described connects the air valve 35 with the fuel metering rods 54 for simultaneous movement.

An upturned tab 59 is affixed to the air valve 35 at its longitudinal center by a pair of rivets 61. The tab 59 has an aperture 62 that pivotally receives an off turned end 63 of a rod 64. The rod 64 extends across the air horn 33 and passes through an aperture in an upstanding wall 65 of the upper carburetor body portion 31. The wall 65 forms one side of a rectangular cavity 66 formed above the wall 37 in the upper body portion 31. An off turned end 67 of the rod 64 passes through an aperture in the end of a nylon bushing 68. The nylon bushing 68 is guided for reciprocation upon a metering cone shaft 69 that extends through the cavity 66 in a plane perpendicular to a vertical plane containing the air valve shaft 36. One end of the metering cone shaft 69 is fixed in the wall 65 as at 71. The opposite end of the metering cone shaft 69 is fixed in an opposing wall 72 of the upper body portion 31. A three-dimensional metering cone 73 is axially affixed to the nylon bushing 69 by a snap ring 74. It should be readily apparent that as the air valve 35 pivots the rod 64 will urge the bushing 68 and the metering cone 73 in an axial direction.

The axial movement of the metering cone 73 is transmitted to the metering rods 54 in the manner now to be described. A bifurcated metering rod carriage 75 is pivotally journaled upon a shaft 76 that is journaled, in turn, in a bushing 77 (FIGURE 2) formed in the upper body portion 31 at one side of the cavity 66. A fuel metering screw 78 is threaded through the carriage 75 for engagement with the metering cone 73. The bifurcated arms of the carriage 75 pivotally support a metering rod shaft 79 that has enlarged, internally threaded portions 80 formed at each side thereof. A threaded upper end 81 of each of the metering rods 54 is received in the enlarged end portions 80. The threaded connection between the metering rods 54 and the enlarged end portions 80 permits independent adjustment of each of the metering rods. As the metering cone 73 is reciprocated by movement of the air valve 35, the fuel metering screw 78 is raised or lowered. The attendant pivotal movement of the metering rod carriage 75 about the shaft 76 causes the metering rods 54 to be raised or lowered within the metering jets 53 to vary the rate of fuel discharge.

The cavity 66 is enclosed by a cover plate 82 that is held in place by a plurality of screws 83. The screws 83 adjacent to the air horn 33 also affix an air cleaner attaching bracket 84 to the carburetor assembly. A stud 85 extends upwardly from the air cleaner attaching bracket 84 to permit attachment of an air cleaner of any known type (not shown to the carburetor assembly).

A leaf spring 86 (FIGURE 4) is affixed to the cover plate 82 above the metering rod shaft 79. If inertial forces upon the carburetor tend to cause the carriage 75 to pivot in a counterclockwise direction and withdraw the metering rods 54 from the metering jets 53, the metering rod shaft 79 will strike the leaf spring 86. The metering rods 54 then will be driven downwardly into the metering jets 53 and the fuel metering screw 78 will again contact the metering cone 73.

The shaft 76 is pivotally supported in the bushing 77 and the portion that pivotally supports the carriage 75 is eccentrically disposed to the pivotal axis in the bushing 77. By rotating the shaft 76 in the bushing 77 it is possible to cause the carriage 75 to pivot about the point of contact of the fuel metering screw 78 with the metering cone 73. This pivotal movement of the carriage 75 causes the metering rods 54 to be adjusted without effecting movement of the air valve 35. Said another way, the relationship between the air valve 35 and the fuel metering rods 54 may be varied by rotating the shaft 76 within its journal 77. This variation in the relationship between the air valve and fuel metering rods is employed to provide a richer mixture for cold weather operation.

Figure 3:
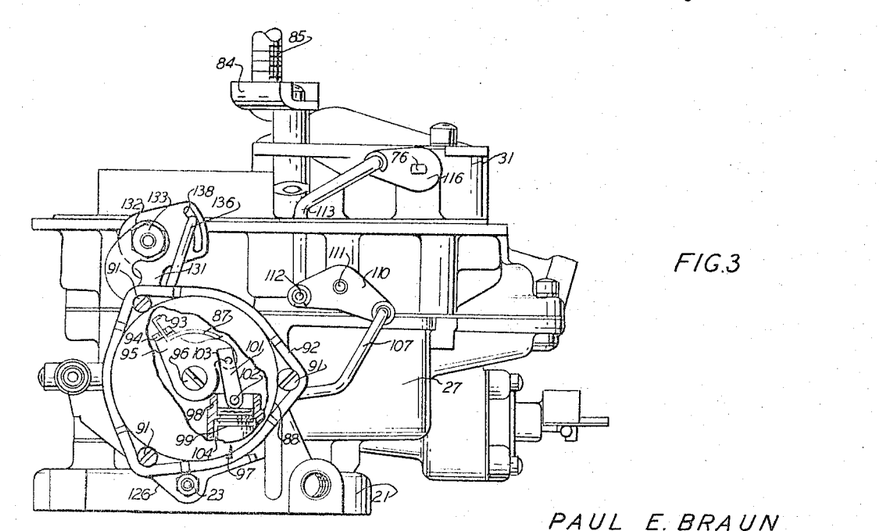
FIGURE 3 is an elevational view opposite to FIGURE 1.

The cold weather enrichment is controlled by a bimetallic coil spring 87 that is contained within housing 88 affixed to one side of the carburetor (FIGURES 2 and 3). One end of the coil bimetallic spring 87 is affixed to an insulating cover 89 that is affixed to the housing 88 by a plurality of screws 91 and a sheet metal clamp 92. The other end of the bimetallic spring 87 is bent outwardly, as at 93 and is received in a slotted end 94 of a lever 95. The lever 95 is affixed for rotation with a shaft 96 that is journaled within the housing 88 and extends inwardly therefrom toward the carburetor. The angular position of the lever 95 and shaft 96 is dependent upon the temperature of the bimetallic spring 87.

The cold weather enrichment also is modulated by a vacuum piston assembly, indicated generally by the reference numeral 97. The vacuum piston assembly 97 includes a cylindrical bore 98 formed in the housing 88. A vacuum piston 99 is supported for reciprocation within the bore 98. A link 101 is pivotally connected at one of its ends by a pin 102 to the piston 99 and by a pin 103 to the lever 95 at its other end. A suitable vacuum passage (not shown) extends from the cylindrical bore 98 on the lower side of the piston 99 through the housing 88, lower carburetor body portion 27 and throttle body 21 to a point in the inductive passage posterior to the throttle valves 24. The lower surface of the piston 99 will thereby be exposed to intake manifold vacuum.

A slot 104 is formed at one side of the bore 98. When the piston has moved downwardly to a sufficient amount to register with the slot 104, air may leak from the housing 88 past the piston 99 through the manifold vacuum passages into the intake manifold. The air flow through the housing 88 is employed to provide a source of heat for the bimetallic spring 87. A warm air inlet fitting 105 (FIGURE 2) is formed in the housing 88. A suitable conduit (not shown) is provided to convey heated air from the engine exhaust manifold or some other portion of the engine to the warm air inlet fitting 105. The heated air may flow through an inlet passage (not shown)

in the housing 88 and pass across the bimetallic spring 87 to provide a degree of heat that is indicative of the engine temperature. The heated air flows past the piston 99 through the slot 104 for discharge into the intake manifold.

Figure 5:
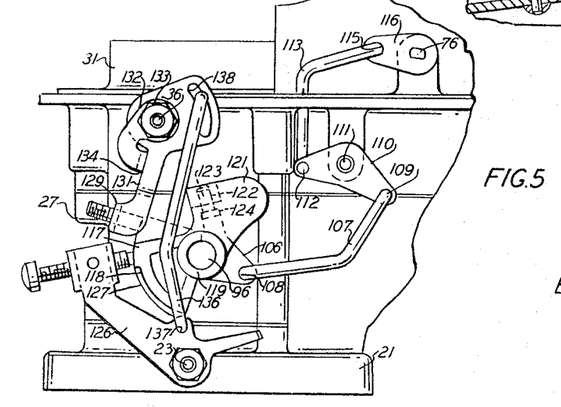
FIGURE 5 is a side elevational view in the direction of the line 5—5 of FIGURE 2.

The shaft 96 is interconnected to the shaft 76 by the linkage shown in FIGURE 5. A lever 106 is affixed to the inner end of the shaft 96. One end of a link 107 is pivotally connected to the lever 106, as at 108. The upper end of the link 107 is offset, as at 109, and as received within an aperture in one end of a bellcrank 110. The bellcrank 110 is pivotally supported upon the upper carburetor body portion 31 by a pivot pin 111. The other end of the bellcrank 110 has an aperture 112 that receives the lower end of a link 113. The link 113 extends through an elongated slot 114 in the upper carburetor body portion 31 (FIGURE 2) and has an offset end that extends toward the shaft 76. The offset end of the link 114 is pivotally received in an aperture 115 formed in a lever 116. The lever 116 is affixed to the shaft 76. Rotation of the shaft 96 is transmitted through the lever 106, link 107, bellcrank 110, link 113, and lever 116 to the shaft 76. As noted, rotation of the shaft 76 in the journal 77 causes pivotal movement of the carriage 75.

In addition to the cold weather enrichment mechanism described, further means are provided to insure an adequate starting mixture at low temperatures. This starting enrichment means will be described in detail later.

Means are additionally provided to establish a faster than normal idle speed at low temperatures. A fast idle cam 117 having a stepped cam surface 118 has a bushing portion 119 that is journaled upon the shaft 96. A counterbalancing portion 121 of the fast idle cam 117 has a threaded aperture 122 that receives a screw 123. The screw 123 is adapted to engage a shoulder 124 formed on the lever 106. As the temperature of the bimetallic spring 87 decreases, the shaft 96 is rotated in a clockwise direction as seen in FIGURES 3 and 5. The counterclockwise rotation of the lever 106 causes the shoulder 124 to engage the screw 123 and rotate the fast idle cam 117 in a counterclockwise direction. The stepped cam surface 118 is engaged by a screw 125 threaded through a throttle lever 126 secured to the throttle valve shaft 23. Engagement of the screw 125 with the stepped cam surface 118 prevents the throttle valves 24 from closing to their normal idle position and establishes a fast idle position for warm up.

Since the air valve 35 is normally biased to a closed position by the coil spring 57, it will function as a choke valve when the engine is being started. This is desirable when the engine is cold to insure that a rich starting mixture will be drawn from the discharge nozzles 45. When the engine is warm, however, the rich mixture caused by a closed air valve 35 could result in flooding of the engine. Means are provided, therefore to hold the air valve 35 in a partially open position when the engine is warm. This means also will assist in accomplishing the cold starting enrichment as will become apparent as this description proceeds.

Referring again to FIGURE 5, the lever 106 that is secured for rotation with the shaft 96 has a cam surface 127. The cam surface 127 is engaged by an adjustable screw 128 threaded through a tang 129 formed on a lever 131. The lever 131 is journaled upon the air valve shaft 36 and is axially positioned thereon by a nut 133. The lever 132 has an inturned end 134 that is adapted to be engaged by the lever 131. The configuration of the cam surface 127 is such that when the bimetallic spring 87 is cold the cam surface 127 does not interfere with the movement of the air valve 35 to its fully closed position. When the engine and bimetallic spring 87 are warmed, however, the shaft 96 is rotated to bring the high portion of the cam surface 127 into engagement with the screw 128. The lever 131 is rotated in a clockwise direction as viewed in FIGURE 5 and the inturned end 134 of the lever 132 is contacted by the lever 131 to move the air valve 35 to a partially opened position. By suitably adjusting the screw 128, the idle position of the air valve 35 may be fixed.

The engine may become flooded because of improper starting procedure either when the bimetallic spring 87 is warm or cool. An unloader mechanism is provided to permit partial opening of the air valve 35 when the engine has been flooded for easier starting. The unloader mechanism comprises a link 136 that is pivotally connected at its lower end within an aperture 137 formed in the throttle lever 126. An offset upper end of the link 136 is received in an elongated slot 138 formed in the lever 131. The slot 138 has sufficient length to permit normal operation of the air valve 35 since the throttle valves 24 normally will be opened to a greater extent than the air valve 35. If the engine is not running and has been flooded, the throttle valves 24 and throttle valve shaft 23 are rotated to their fully opened position. This causes the throttle lever 126 to be rotated in a counterclockwise direction as viewed in FIGURE 5. The link 136 is drawn downwardly with its upper end traversing the length of the slot 138. Before the throttle valves 24 reach their fully opened position, the upper end of the link 136 contacts the end of the slot 138. Continued movement of the throttle valve shaft 23 and throttle lever 126 will cause rotation of the lever 131 in a clockwise direction. The clockwise rotation of the lever 131 is transmitted to the inturned end 134 of the lever 132 and to the air valve shaft 36. The air valve 35 is then rotated to a partially opened position.

Figure 7:
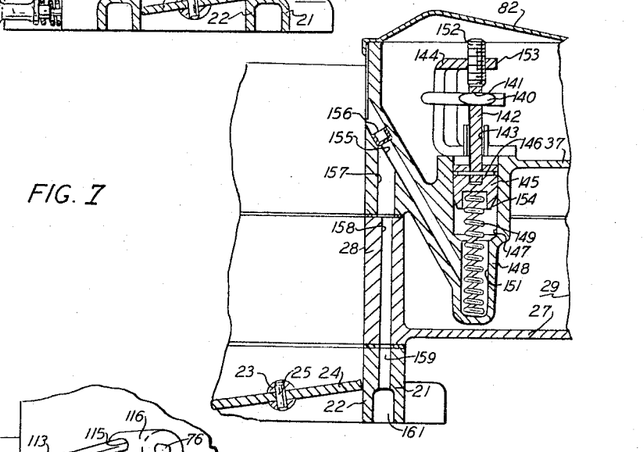
FIGURE 7 is a cross-sectional view taken along the line 7—7 of FIGURE 2.
Figure 8:
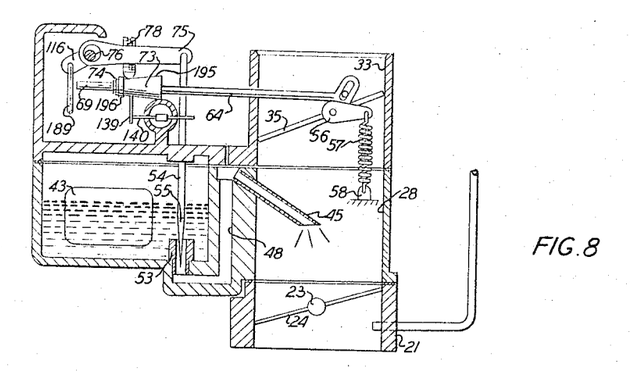
FIGURE 8 is a schematic cross-sectional view of the carburetor.
Figure 9:
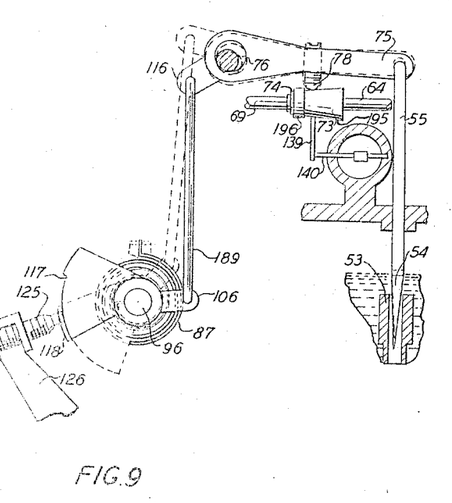
FIGURE 9 is an enlarged schematic view showing the temperature responsive fuel adjustment.

In addition to the cam surface formed in the direction normal to the axis of the metering cone shaft 69, the metering cone 73 is not symmetrical about its longitudinal axis. Rotary movement of the metering cone 73 upon the metering cone shaft 69 produces movement of the metering rod carriage 75 and movement of the metering rods 54 relative to the air valve 35. The variation in fuel flow accomplished by rotation of the metering cone 73 is utilized to provide power enrichment. For reasons of economy, the normal running fuel air ratio is less than that required to produce maximum power output. As seen in FIGURES 2, 4 and 7, a lever 139 is affixed to the end of the metering cone 73 remote from the air valve 35. A pin 140 extends toward the air valve 35 from the outer end of the lever 139. The pin 140 passes through an aperture 141 formed in a link 142 (FIGURE 7). The link 142 is guided in a slot 143 formed in a bracket 144 that is affixed to the upper body portion 31 adjacent the wall 37. The lower end of the link 142 is pivotally connected to a vacuum piston 145 by a pin 146. The vacuum piston 145 is guided for reciprocation in a bore 147 formed in a depending projection 148 of the upper body portion 31. A coil spring 149 is contained at its lower end within a bore 151 formed below the bore 147. The upper end of the coil spring 149 normally urges the vacuum piston 145 in an upward direction.

An adjustable screw 152, threaded into an upper arm 153 of the bracket 144, engages the upper end of the link 142 to limit the upward movement of the piston 145. By limiting the upward movement of the piston 145, the screw 152 affixes the angular position of the lever 139 and the position of the metering cone 73 at one extreme of its angular movement. A tapered bottom surface 154 of the piston 145 contacts the shoulder formed where the bores 147 and 151 merge to limit the downward movement of the piston 145 and the angular position of the lever 139 and the position of the metering cone 73 at the other extreme of the latter's angular movement.

A diagonal vacuum passage 155 extends upwardly through the projection 148 from the bore 151. The upper end of the passage 155 is closed by a plug 156. Adjacent the plug 156, the passage 155 intersects a vertically extending passage 157 formed in the upper carburetor body portion 31. The passage 157 registers with a vertically extending passage 158 in the lower body portion 27 and a similar passage 159 in the throttle body 21. The throttle body passage 159 is exposed at its lower end 161 to intake manifold vacuum. The intake manifold vacuum operating through the passages 159, 158, 157 and 155 normally overcomes the action of the coil spring 149 and draws the piston 145 downwardly. This causes the metering cone 73 to be rotated to a position that provides a minimum fuel flow. When the intake manifold vacuum falls off, indicating a period of increased power demand, the coil spring 149 urges the piston 145 upwardly. This rotates the metering cone 73 to a position that causes the carriage 75 to be pivoted upwardly to raise the metering rods 54 in the metering jets 53. Additional fuel flow is provided at this time. Because the pin 140 slides within the aperture 141 in the link 142, the power enrichment may be provided regardless of the axial position of the metering cone 73.

During sudden openings of the throttle valves 24 it may be necessary to eject a small amount of fuel into the induction passages 28 by means of an accelerating pump, indicated generally by the reference numeral 162 and shown in greater detail in FIGURES 1, 2 and 4. The accelerating pump 162 includes a pump cavity 163 formed in the lower carburetor body portion 28 at one side of the fuel bowl 29. An inlet passage 164 extends from the lower end of the fuel bowl 29 toward the pump cavity 163. A vertical passage 165 intersects inlet passage 164 and registers with the pump cavity 163 through an enlarged bore 166. An inlet ball check 167 is positioned at the mouth of the vertical passage 165. A pump discharge passage 168 extends transversely through the lower wall of the lower carburetor body portion 28. The discharge passage 168 terminates in the vertically extending passage 169 with an enlarged upper end 171. A discharge ball check 172 is positioned in the enlarged end 171. Accelerating pump shooters 173 (only one of which is shown) extend from the upper end 171 into each induction passage 28.

A flexible diaphragm 174 positioned across the mouth of the pump cavity 163 is held in place by an accelerating pump cover 175. A plurality of bolts 176 secure the accelerating pump cover 175 to the lower carburetor body portion 27. An accelerating pump plunger 177 supported for reciprocation by the pump cover 175 is affixed to the diaphragm 174 as at 178.

A pump operating lever 179 is pivotally journaled on the accelerating pump cover 175 by a pin 181. An accelerating pump drive link 182 has a downturned end that is received in an aperture 183 at one end of the pump operating lever 179. The forward end of the accelerating pump drive link 182 is offset, as at 184, for receipt in an aperture 185 formed in a lever 186 that is journaled upon the throttle valve shaft 23. A coil mouse trap spring 187 normally urges the lever 186 for simultaneous rotation with the throttle valve shaft 23.

When the throttle valves 24 are being closed, a coil spring 188 urges the diaphragm 174 in a direction that tends to enlarge pump cavity 163. The inlet ball check 167 is unseated and the pump cavity 163 is charged with fuel. When the throttle valves 24 are rapidly opened, the plunger 177 drives a diaphragm 174 inwardly to close the inlet ball check 167. Fuel is impelled past the unseated discharge ball check 172 out of the accelerating pump shooters 173 into the induction passages 28.

*Operation*

The operation of the carburetor will be described primarily through reference to FIGURES 8–11. Assuming that the engine is not running and the outside temperature is low, the bimetallic spring 87 will coil and rotate the shaft 96 in a counterclockwise direction as viewed in FIGURE 9. The counterclockwise rotation of the shaft 96 causes the lever 106 also to be rotated in a counterclockwise direction. The rotation of the lever 106 is transmitted to the shaft 76 through the linkage shown in FIGURE 5. The interconnecting linkage has been shown schematically as a single link 189 in FIGURES 8–10. The link 189 moves upwardly causing the lever 116 and shaft 76 to be rotated in a clockwise direction. The clockwise rotation of the shaft 76 in the journal 77 causes the carriage 75 to pivot in a counterclockwise direction about the point of contact of the fuel metering screw 77 with the metering cone 75. The vacuum piston 99 (FIGURE 3) follows the movement of the other linkage when the engine is not running. The movement of carriage 75 causes the metering rod 54 to be raised relative to the metering jet 53. The cold weather position is shown by the dotted lines in FIGURE 9.

Even with the aforementioned temperature enrichment, there is insufficient cranking vacuum experienced at the outlet end of the discharge nozzle 45 to draw enough fuel for starting. It is necessary, therefore, to raise the metering rods 55 within the metering jets 53 to permit sufficient fuel flow for starting. This enrichment is provided in the manner now to be described.

The metering cone 73 is formed with two cam surface portions 195 and 196 that are contacted by the fuel metering screw 78 to provide varying rates of fuel flow. The portion 195 has a gradual taper with the metering cone diameter being greatest at the point where the metering screw 78 contacts it when the air valve 35 is in its fully opened position. As the air valve 35 moves from the fully opened to a partially opened, normal idle position, the radius of the metering cone 73 decreases progressively. The diameter of the portion 195 is the smallest at the normal engine idle position, which is determined by the contact of the adjustable screw 128 with the cam surface 127, as has previously been described.

Figure 12:
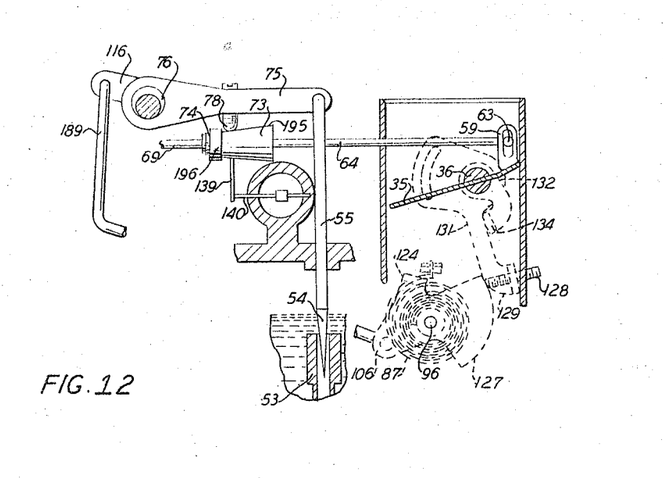
FIGURE 12 is a schematic view showing the cold starting enrichment mechanism in one position.
Figure 13:
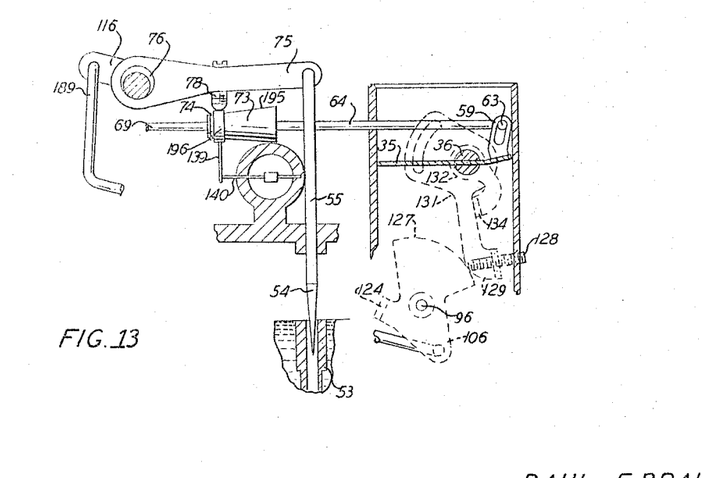
FIGURE 13 is a schematic view, similar to FIGURE 12, showing another position.

The second portion 196 of the metering cone surface has a greater radius than the radius contacted by the screw 78 during normal idle. When the engine is stopped and the temperature of the bimetal spring 87 is low, the cam surface 127 rotates to permit the air valve 35 to move to a fully closed position (FIGURE 13). The closing of the air valve 35 past its normal idle position causes the metering cone 73 to be reciprocated so that the metering screw 78 contacts the second portion 196. The increased radius of the metering cone 73 at the portion 169 causes the metering rod carriage 75 to be pivoted in a counterclockwise direction and withdraws the metering rod 55 from the metering jets 53. When this occurs additional fuel may flow from the discharge nozzles 45 during cranking. When the engine fires and commences to run a sudden decrease in intake manifold vacuum will occur. This decreased pressure is experienced in the portion of the induction passages between the throttle valve 24 and the air valve 35. The decreased pressure causes the air valve 35 to rotate to a partially opened position (FIGURE 12) and moves the metering cone 73 in an axial direction. The metering screw 78 then contacts the metering cone portion 195.

The enrichment provided by the temperature responsive mechanism that operates the shaft 76 continues to be effective when the engine commences to run. The enrichment provided by this mechanism is diminished to some extent however by the action of the vacuum piston assembly 97. When the engine fires and commences to run, a sudden increase in the intake manifold vacuum occurs. The increased intake manifold vacuum draws the vacuum piston 99 (FIGURE 3) downwardly within the bore 98 until the piston 99 passes the slot 104. When the piston 99 passes the slot 104 further vacuum induced movement of the piston 99 will not occur. The downward movement of the piston 99 is transmitted to clockwise rotation of the shaft 96 to cause a partial leaning of the cold running mixture. The mixture will still be richer than normal, however, because of the tension exerted by the bimetallic spring 87.

In addition to positioning the metering rods 54, the movement of the shaft 96 is transmitted to the fast idle cam 117 so that the high portion of the stepped cam surface 118 is contacted by the adjustable screw 125 of the throttle lever 126. This establishes a faster than normal idle speed during warm up.

The vacuum exerted in the induction passage 28 also acts upon the unbalanced air valve 35 to cause it to partially open against the action of the coil spring 57. As the air valve 35 opens the metering cone 73 is moved toward the left and the fuel metering screw 77 rides upon the tapered surface of the metering cone 73. The movement of the metering screw 77 causes the metering rod carriage 75 to pivot in a counterclockwise direction about its supporting shaft 76 to raise the metering rods 54 in the metering jet 53. The enrichment caused by the rotation of the shaft 76 by the bimetallic spring 87 also will remain in effect.

As the throttle valve 24 is opened, the air valve 35 will open to maintain a substantially constant pressure in the induction passage 28. The opening of the air valve 35 is transmitted to the metering cone 73 and metering rod 54 in the manner previously described. As the bimetallic spring 87 becomes heated from engine operation the shaft 76 is rotated to lean out the cold weather enrichment. When the bimetallic spring 87 reaches normal operating temperature the temperature enrichment portion of the fuel metering mechanism is moved to the solid line position shown in FIGURE 9.

The cam surface 127 of the lever 106 also is contacted by the adjustable screw 128 on the lever 131 as the temperature of the bimetallic spring 87 increases (FIGURE 5). The shape of the cam surface 127 and the position of the adjustable screw 128 are chosen so that air valve 35 is held in its normal idle position. Opening or closing of the air valve 35 in the idle position will determine engine idle characteristics. The cam surface 127 is primarily effective in positioning the air valve 35 when the engine is at its normal operating temperature since there may be insufficient vacuum signal in the induction passage 28 to operate the air valve 35. If desired, the cam surface 127 may be formed to fix the idle position of the air valve 35 at all temperatures. This is generally unnecessary, however, because of the fast idle provision at low temperatures. The normal fast idle generally establishes sufficient vacuum signal to position the air valve 35.

Figure 10:
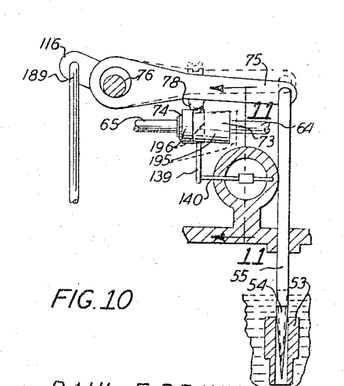
FIGURE 10 is an enlarged schematic view showing the power enrichment adjustment.
Figure 11:
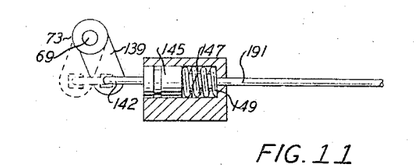
FIGURE 11 is a schematic cross-sectional view taken substantially along the line 11—11 of FIGURE 10.

Normally the vacuum piston 145 of the power enrichment mechanism will be drawn into the bore 147 against the action of the coil spring 149 by the high intake manifold vacuum acting through the vacuum passages indicated schematically by the reference numeral 191 (FIGURES 10 and 11). The movement of the vacuum piston 145 is transmitted through the link 142 to the pin 140 and lever 139. The metering cone 73 is rotated to the solid line views shown in FIGURES 10 and 11. The metering cone 73 has a small radial dimension in this position. If the intake manifold falls off, as it does during periods of high power demand, the vacuum operating on the piston 145 is insufficient to overcome the action of the coil spring 147 and the piston 145 is urged to the left as seen in FIGURE 11. The movement of the piston 145 is transmitted through the link 142 and lever 139 to the metering cone 73. The metering cone 73 has a greater radial dimension in this position and the contacting fuel metering screw 77 is urged upwardly to cause the carriage 75 to pivot in a counterclockwise direction about the shaft 76. The metering rod 54 is withdrawn from the metering jet 53 and a richer fuel air mixture is discharged from the carburetor.

It should be readily apparent that the adjustable connection between the air valve 35 and the metering rod 54 may be adjusted simultaneously by the bimetallic spring 87 and the vacuum piston 145. The metering rods 54 can therefore be adjusted relative to the air valve 35 to suit engine power and temperature conditions.

It is to be understood that this invention is not limited to the exact construction shown and described but that various changes and modifications may be made without departing from the spirit and scope of the invention, defined by the appended claims.

We claim:

1. A carburetor for an internal combustion engine comprising an induction passage, a throttle valve for controlling the flow of combustible mixture through said induction passage, air valve means in said induction passage anterior to said throttle valve, said air valve means being movable in response to pressure variations in said induction passage for maintaining a substantially constant pressure between said air valve and said throttle valve, a fuel source, a fuel discharge circuit for discharging fuel from said fuel source into the portion of said induction passage between said air valve and said throttle valve, a fuel metering valve for controlling a rate of fuel flow through said fuel discharge circuit, a metering cam, means interconnecting said metering cam and said air valve means for simultaneous movement, follower means in engagement with said metering cam for movement upon movement of said metering cam, means interconnecting said follower means and said fuel metering valve for operating said fuel metering valve upon movement of said air valve means, said metering cam having a first portion providing a decreasing rate of fuel discharge during a first range of movement of said air valve means from a fully opened to a partially opened, normal idle position and a second portion providing a greater rate of fuel discharge than the discharge at said normal idle position when said air valve means moves to a fully closed position.

2. A carburetor as defined by claim 1 wherein temperature responsive stop means limits the movement of the air valve means from its normal idle position to its fully closed position when the temperature exceeds a predetermined value.

3. The carburetor of claim 1 in which the metering cam is a cone having a small diameter for metering idling fuel and a larger diameter for metering starting fuel.

4. The carburetor of claim 3 in which the air valve responds to air flow to move the cone from metering starting fuel to metering idling fuel.

5. A carburetor for an internal combustion engine comprising
   an induction passage,
   a throttle valve for controlling the flow of combustible mixture through said induction passage,
   air valve means in said induction passage anterior to said throttle valve, said air valve means being movable in response to pressure variations in said induction passage for maintaining a substantially constant pressure between said air valve and said throttle valve,
   a fuel source,
   a fuel discharge circuit for discharging fuel from said fuel source into said induction passage between said air valve and said throttle valve,
   a fuel metering valve for controlling the rate of fuel flow through said fuel discharge circuit, and
   a metering cone positioning said fuel metering valve in response to the position of said air valve means, said metering cone having an idling portion and a starting portion that increases the amount of fuel supplied to the engine when the engine is being started.

6. The carburetor of claim 5 in which the air valve responds to air flow to move the cone from metering starting fuel to metering idling fuel.

(References on following page)

References Cited by the Examiner

UNITED STATES PATENTS

| | | | |
|---|---|---|---|
| 1,208,973 | 12/1916 | Jensen | 261—50 |
| 2,365,910 | 12/1944 | Shaff | 261—39 |
| 2,457,570 | 12/1948 | Leibing | 261—50 |
| 2,600,368 | 6/1952 | Winkler | 261—39 |
| 2,989,950 | 6/1961 | Lockman. | |
| 2,996,051 | 8/1961 | Mick | 261—39 |
| 3,023,744 | 3/1962 | Mick | 261—39 |
| 3,249,346 | 4/1966 | Bickhaus et al. | 261—50 X |
| 3,263,974 | 8/1966 | Braun et al. | 261—50 X |

FRANK W. LUTTER, *Primary Examiner.*

HARRY B. THORNTON, T. R. MILES,
*Assistant Examiners.*